June 18, 1935.  O. R. OLSON ET AL  2,005,470
WINDMILL
Filed Nov. 6, 1933  2 Sheets-Sheet 2
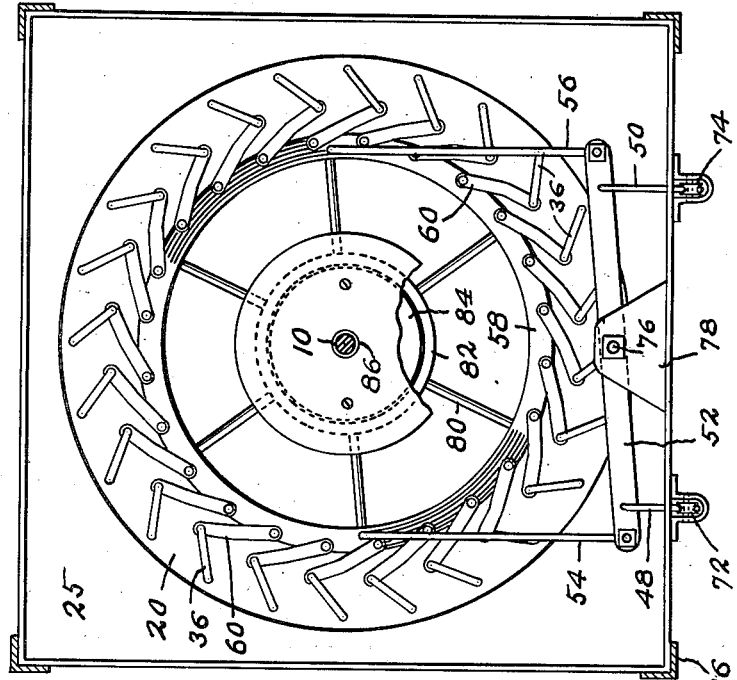
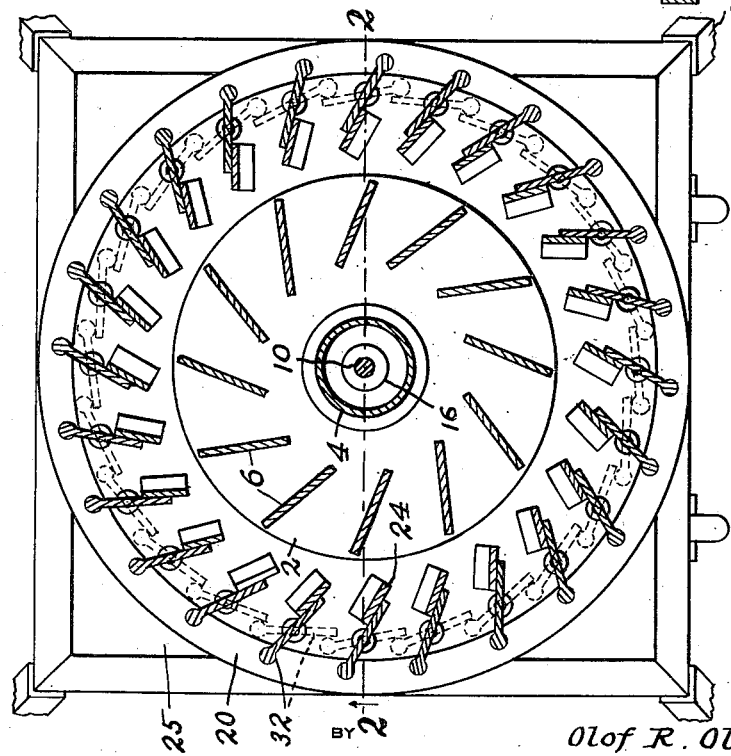
INVENTORS:
Olof R. Olson,
and Herbert L. Mika,
F. G. Fischer, ATTORNEY.

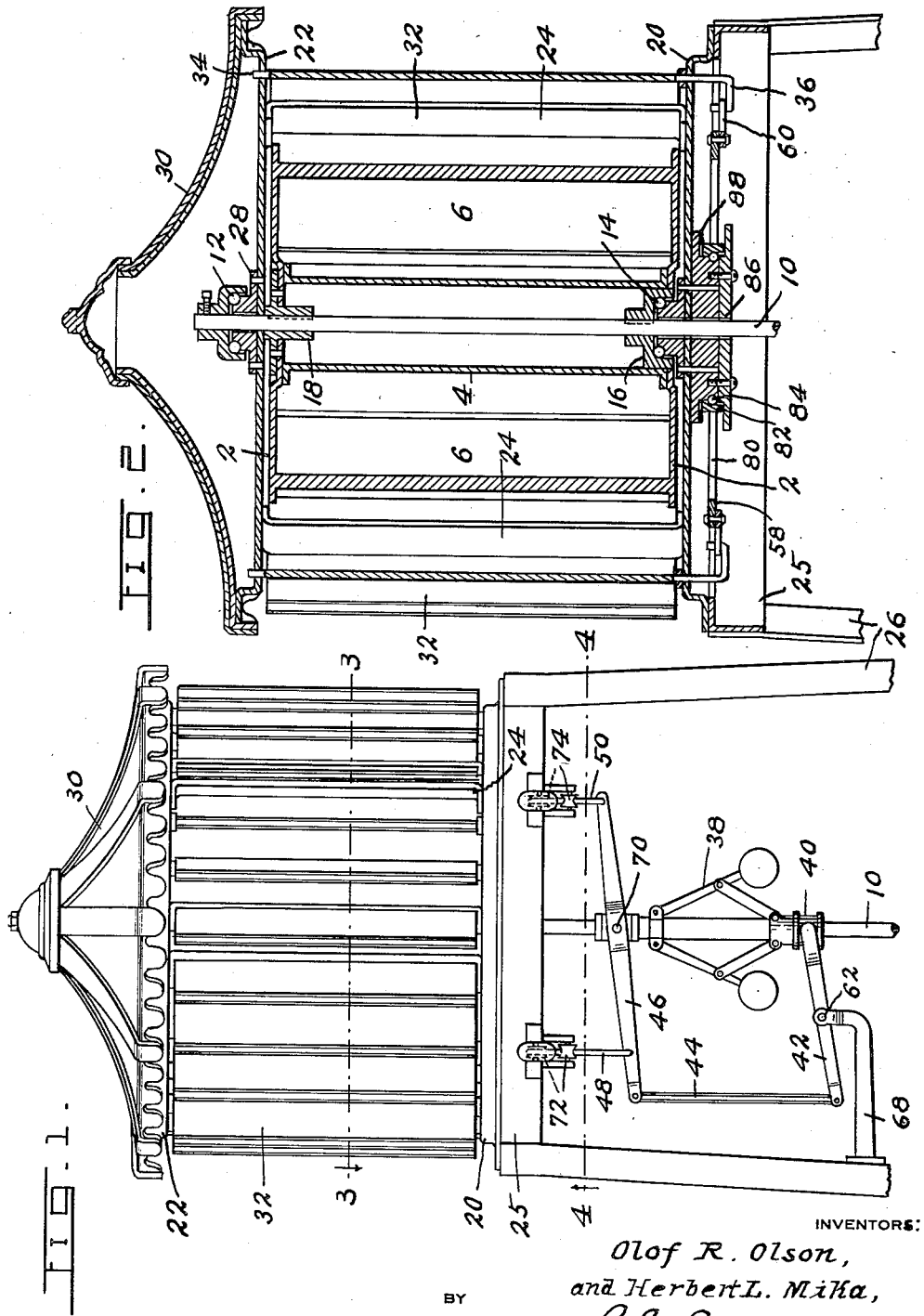

Patented June 18, 1935

2,005,470

UNITED STATES PATENT OFFICE 2,005,470

WINDMILL

Olof R. Olson, Kansas City, Mo., and Herbert L. Mika, Kansas City, Kans.; said Mika assignor to said Olson Application November 6, 1933, Serial No. 696,810

2 Claims. (Cl. 170—17)

Our invention relates to windmills and one object is to provide a structure of this character with a novel form of wind-wheel having its vanes arranged in parallelism to the axis of said wheel instead of radially thereto as is customary, to the end that more vane surface may be presented to the action of the wind with a resultant increase in power.

A further object is to provide a windmill with novel means for directing the wind against the vanes in such manner that the force of the wind may be utilized in the most efficient manner for propulsion of the wind-wheel.

Another object is to provide means for regulating the amount of wind admitted to the wind-wheel so that the speed of the latter may be more uniformly maintained.

Other objects will hereinafter appear and in order that the invention may be fully understood reference will now be had to the accompanying drawings, in which:

Fig. 1 is a front elevation of the windmill with a portion of the tower broken away.

Fig. 2 is a vertical cross section on a slightly larger scale than Fig. 1 and taken on line 2—2 of Fig. 3.

Fig. 3 is a horizontal section on line 3—3 of Fig. 1.

Fig. 4 is an inverted cross section on line 4—4 of Fig. 1.

Referring more particularly to the construction of the wind-wheel, 2 designates a pair of disks which are preferably horizontally disposed and spaced apart as shown by Fig. 2. The disks 2 are fixedly united by a cylindrical column 4. A plurality of equally spaced vanes 6 are arranged approximately tangentially to the column 4 and fixed at their ends to the disks 2. A shaft 10 extends axially through the column 4 and is mounted in antifriction bearings 12 and 14, the latter having a member 16 fixed to the shaft 10 and the lower portion of the column 4. The upper portion of the shaft 10 is fixedly mounted in a bearing 18 which in turn is fixed to the upper disk 2.

The wind-wheel is arranged to operate in a stationary skeleton housing comprising a base plate 20, an upper plate 22, and wind deflectors in the form of blades 24. The base plate 20 is disposed beneath the wind-wheel and is fixed to a platform 25 forming the upper portion of a tower 26 which carries the skeleton housing. The upper plate 22 is disposed above the wind-wheel and is united to the base plate 20 by the blades 24. The lower member 28 of the bearing 12 is fixed to the upper plate 22, which latter is surmounted by a roof 30.

Referring now more particularly to the means for controlling the amount of wind admitted to the wind-wheel, 32 designates a plurality of shutters arranged in an annular row about said wind-wheel. The shutters 32 also, when open, cooperate with the blades 24 in directing the wind against the vanes 6. Each shutter 32 is fixedly mounted at its upper end upon an intermediately disposed stub shaft 34 and at its lower end upon a crank shaft 36, which latter is arranged in axial alinement with the stub shaft 34. The shutters 32 are preferably equal in number to the blades 24 which latter limit the opening of said shutters so that when fully open they will extend somewhat at a tangent to the vanes 6, as shown in full lines, Fig. 3, and thus direct the wind in a way to act efficiently upon the vanes.

The shutters 32 may be either manually controlled or automatically controlled, but we prefer the latter control as the shutters are thereby opened and closed according to the velocity of the wind. In other words when the velocity is low the maximum quantity of wind is admitted to the wind-wheel, while a lesser quantity is admitted as the velocity increases, and in the event the wind attains such high velocity as to endanger the safety of the wind-wheel the shutters 32 are completely closed as shown by dotted lines, Fig. 3.

It is evident that different means may be employed for automatically controlling the opening and closing of the shutters 32 and in the present instance we have shown such means in the form of a well-known type of centrifugal governor 38 which is driven by the shaft 10 of the wind-wheel. The governor 38 may be operably connected to the crank shafts 36 in any suitable manner. In the present instance we have shown such connection through the intermediary of a sleeve 40, a lever 42, a connecting rod 44, a lever 46, cables 48 and 50, a lever 52, Fig. 4, connecting rods 54 and 56, an annulus 58 and links 60.

The lever 42 is mounted upon a fulcrum 62 carried by an arm 68. The lever 46 is mounted upon a fulcrum 70 at opposite sides of which it is connected to the cables 48 and 50 which run over guide pulleys 72 and 74, respectively, to the opposite ends of the lever 52 which is mounted upon a fulcrum 76 carried by a bracket 78. The connecting rods 54 and 56 are operably connected to the opposite ends of the lever 52 and diametrically opposite portions of the annulus 58, while the links 60 are pivotally connected at one end to said annulus 58 and at their opposite end to the respective cranks 36. The annulus 58 is mounted upon the outer ends of radial spokes 80 fixed at their inner ends to a hub 82 mounted upon an antifriction bearing 84, arranged concentrically with the shaft 10. The antifriction bearing 84 has a central aperture 86, through which the shaft 10 freely extends, and an upper member 88 fixed to the under side of the base plate 20.

In practice the wind is directed by the blades 24 and the shutters 32 against the nearest vanes 6 of the wind-wheel and after acting thereon flows through the wind-wheel and acts upon a number of the vanes 6 as it escapes from a point approximately diametrically opposed to its point of entry. As the velocity of the wind varies the shutters 32 are vibrated through the action of the centrifugal governor 38 which automatically adjusts the shutters 32 towards the closed position as the velocity increases and towards fully open position as the velocity decreases, thereby maintaining substantially uniform speed of the wind-wheel. Should the shutters 32 become fully closed the wind is shut out from the wind-wheel and the latter stops until the shutters again open.

From the foregoing description it is apparent that we have provided a windmill possessing the advantages above pointed out and while we have shown one form of said windmill we reserve all rights to such other forms and modifications thereof as properly fall within the spirit and scope of the invention as claimed.

Having thus described our invention, what we claim and desire to secure by Letters Patent, is:

1. In a windmill having a housing, a wind-wheel disposed within the housing and comprising a vertically arranged rotary shaft journaled in said housing, a pair of horizontally disposed disks spaced apart and fixedly mounted upon said shaft, a vertically-disposed cylindrical column fixed to said disks and surrounding the shaft, and a plurality of vertically disposed equally spaced vanes arranged approximately at a tangent to said column and fixed to the disks, said vanes being spaced from the column to leave intervening openings for the passage of the wind.

2. A windmill comprising a housing having openings for admitting the wind, a wind-wheel operably mounted within said housing and including a rotary shaft and equally spaced vanes, shutters operably mounted in said housing for regulating the flow of the wind to said wind-wheel, crank shafts mounted in the housing for controlling said shutters, links for actuating said crank shaft, an annulus for actuating said links, a pair of rods connected to diametrically opposed sides of said annulus for actuating the latter, a lever connected near its ends to said rods for actuating the latter, a fulcrum upon which the central portion of said lever is mounted, a pair of cables connected to the ends of said lever to actuate the same, a lever fulcrumed near its central portion and connected near its ends to said cables to actuate the same, a governor driven by the rotary shaft, and means connecting said governor to the last-mentioned lever for actuating the latter.

OLOF R. OLSON.
HERBERT L. MIKA.